US009213475B2

(12) United States Patent
Homma et al.

(10) Patent No.: US 9,213,475 B2
(45) Date of Patent: Dec. 15, 2015

(54) INFORMATION PROCESSING APPARATUS, PROGRAM, AND INFORMATION PROCESSING METHOD FOR REPRESENTING CORRELATION OF PARAMETERS WITHIN OBJECTS

(75) Inventors: Fuminori Homma, Tokyo (JP); Ken Miyashita, Tokyo (JP); Shoichiro Moriya, Tokyo (JP); Tatsushi Nashida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 13/486,083

(22) Filed: Jun. 1, 2012

(65) Prior Publication Data

US 2012/0313975 A1    Dec. 13, 2012

(30) Foreign Application Priority Data

Jun. 10, 2011  (JP) ................. 2011-130542

(51) Int. Cl.
*G09G 5/32*        (2006.01)
*G06F 3/0484*      (2013.01)
*G06F 3/048*       (2013.01)

(52) U.S. Cl.
CPC ............ *G06F 3/04847* (2013.01); *G06F 3/048* (2013.01); *G09G 2320/0261* (2013.01)

(58) Field of Classification Search
CPC ..... G06T 11/00; G06F 3/048; G06F 3/04847; G06F 3/04885
USPC ........................................................ 345/672
See application file for complete search history.

(56) References Cited

U.S. PATENT DOCUMENTS

| | | | | |
|---|---|---|---|---|
| 5,537,630 A | * | 7/1996 | Berry et al. | 715/763 |
| 5,553,224 A | * | 9/1996 | Saund et al. | 345/619 |
| 6,084,590 A | * | 7/2000 | Robotham et al. | 345/419 |
| 6,236,411 B1 | * | 5/2001 | Nikom | 345/443 |
| 6,549,199 B1 | * | 4/2003 | Carter et al. | 345/418 |
| 6,577,319 B1 | | 6/2003 | Kashiwagi et al. | |
| 6,587,119 B1 | * | 7/2003 | Anderson et al. | 345/672 |
| 7,224,360 B2 | * | 5/2007 | Tatsumi | 345/426 |
| 2005/0140677 A1 | * | 6/2005 | Chou | 345/441 |
| 2006/0284861 A1 | * | 12/2006 | Choi | 345/204 |
| 2007/0130540 A1 | * | 6/2007 | Doyle et al. | 715/801 |
| 2008/0208050 A1 | * | 8/2008 | Ichioka | 600/437 |
| 2008/0297514 A1 | * | 12/2008 | Pedersen et al. | 345/442 |
| 2009/0217160 A1 | * | 8/2009 | Drukman et al. | 715/273 |
| 2009/0278937 A1 | * | 11/2009 | Botchen et al. | 348/169 |
| 2010/0189360 A1 | * | 7/2010 | Okita | 382/199 |

FOREIGN PATENT DOCUMENTS

JP    2000-155559 A    6/2000

* cited by examiner

*Primary Examiner* — Stephen R Koziol
*Assistant Examiner* — Terrell Robinson
(74) *Attorney, Agent, or Firm* — Hazuki International, LLC

(57) ABSTRACT

There is provided an information processing apparatus including a selection part selecting a parameter from graphic data, a display control part controlling an object corresponding to the parameter selected by the selection part to be displayed and an extraction part extracting a parameter having a correlation with the parameter selected by the selection part, wherein the display control part controls the object to be moved based on the correlation.

12 Claims, 11 Drawing Sheets

INFORMATION PROCESSING APPARATUS, PROGRAM, AND INFORMATION PROCESSING METHOD FOR REPRESENTING CORRELATION OF PARAMETERS WITHIN OBJECTS

CROSS-REFERENCE TO RELATED APPLICATION

The present application claims priority from Japanese Patent Application No. JP 2011-130542 filed in the Japanese Patent Office on Jun. 10, 2011, the entire content of which is incorporated herein by reference.

BACKGROUND

The present disclosure relates to an information processing apparatus, a program and an information processing method.

Recently, various techniques for reflecting data attributes in display are disclosed. For example, a technique for enhancing expression power of a function mapping the data attribute on a display attribute and allowing a user to arbitrarily and intuitively alter a parameter of the function corresponding to the expression power (e.g., Japanese Patent Laid-Open No. 2000-155559). According to the technique like this, the user can alter the parameter of the mapping function converting the data attribute to the display attribute and the resultant can be reflected in display.

SUMMARY

However, a plurality of parameters having a correlation with each other are sometimes extracted from graphic data. For example, when a circumferential angle and a tangent chord angle are extracted from graphic data, there is a correlation that the circumferential angle and the tangent chord angle are typically equal. But though there is such correlation, the user may not intuitively understand such correlation from the displayed graphic data.

Accordingly, it is desirable for the user to be provided with a technique allowing the user to intuitively understand the correlation between multiple parameters extracted from the graphic data.

According to an embodiment of the present disclosure, there is provided an information processing apparatus which includes a selection part selecting a parameter from graphic data, a display control part controlling an object corresponding to the parameter selected by the selection part to be displayed, and an extraction part extracting a parameter having a correlation with the parameter selected by the selection part, wherein the display control part controls the object to be moved based on the correlation.

Further, according to the embodiment of the present disclosure, there is provided a program causing a computer to function as an information processing apparatus, which includes a selection part selecting a parameter from graphic data, a display control part controlling an object corresponding to the parameter selected by the selection part to be displayed, and an extraction part extracting a parameter having a correlation with the parameter selected by the selection part, wherein the display control part controls the object to be moved based on the correlation.

Still further, according to the embodiment of the present disclosure, there is provided an information processing method which includes selecting a parameter from graphic data, controlling an object corresponding to the parameter to be displayed, extracting a parameter having a correlation with the parameter, and controlling the object to be moved based on the correlation.

As described above, according to the embodiment of the present disclosure, the user can intuitively understand the correlation between multiple parameters extracted from the graphic data.

DETAILED DESCRIPTION OF THE EMBODIMENT(S)

Figure 1:
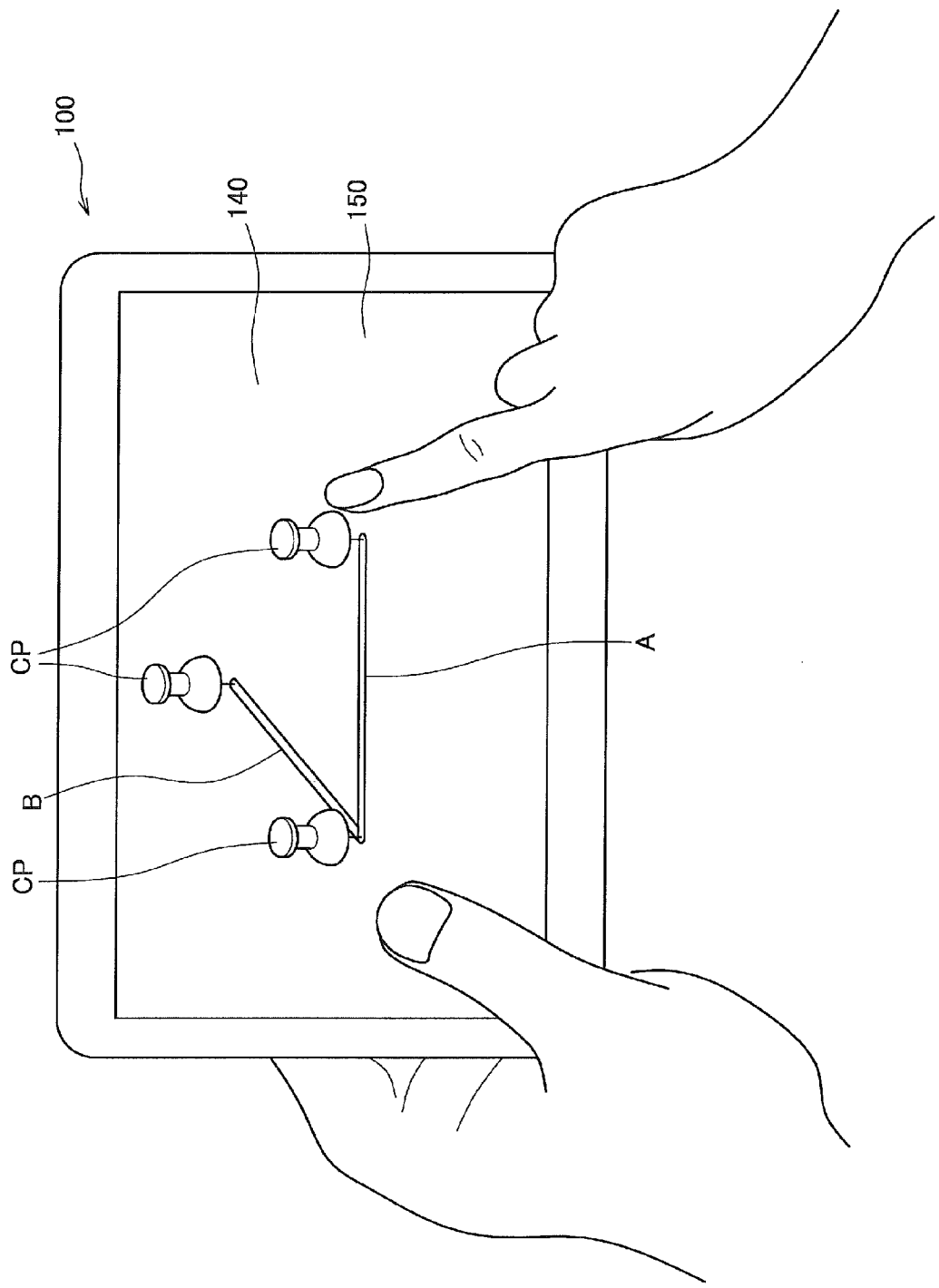
FIG. 1 is a diagram explanatory of an outline of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiments will be described in the following order.
1. Embodiments
1-1. Information Processing Apparatus Outline
1-2. Information Processing Apparatus Configuration Example
1-3. Information Processing Apparatus Operation Flow
2. Conclusion

1. EMBODIMENTS

1-1. Information Processing Apparatus Outline

At first, an information processing apparatus of an embodiment of the present disclosure will be described. FIG. 1 is a diagram explanatory of an outline of the information processing apparatus according to an embodiment of the present disclosure. As illustrated in FIG. 1, the information processing apparatus 100 of the embodiment of the present disclosure may cause a display unit 140 to display a line segment. In FIG. 1, a line segment A and a line segment B are illustrated as examples of the line segments displayed by the display unit 140, but the number of line segments displayed by the display unit 140 is not limited. Alternatively, a graphic (e.g., circle or the like) other than the line segment may be displayed.

When an input unit 150 accepts an input of a move operation, the information processing apparatus 100 may move the line segment according to the move operation. For example, when control points CP for moving the line segment are displayed on both ends of the line segment as illustrated in FIG. 1, the operation of moving those control points CP may be input as the move operation. The line segment with the control points CP at ends thereof may be moved based on the move operation input as above.

In the embodiment of the present disclosure, a touch panel is assumed to be used as the input unit 150. In this case, the user performs the move operation by dragging a moving target from a move source to a move destination by use of an operation tool (e.g., finger, touch pen and the like). However, the input unit 150 is not limited to the touch panel. For example, a mouse, a keyboard, an input interface based on gesture recognition or the like may be used as the input unit 150.

The information processing apparatus 100 according to the embodiment of the present disclosure may be, for example, a smartphone, a PC (Personal Computer) or any other type of apparatus. Alternatively, the information processing apparatus 100 according to the embodiment of the present disclosure may be an information processing module installed in the above-described apparatuses.

1-2. Information Processing Apparatus Configuration Example

Figure 2:
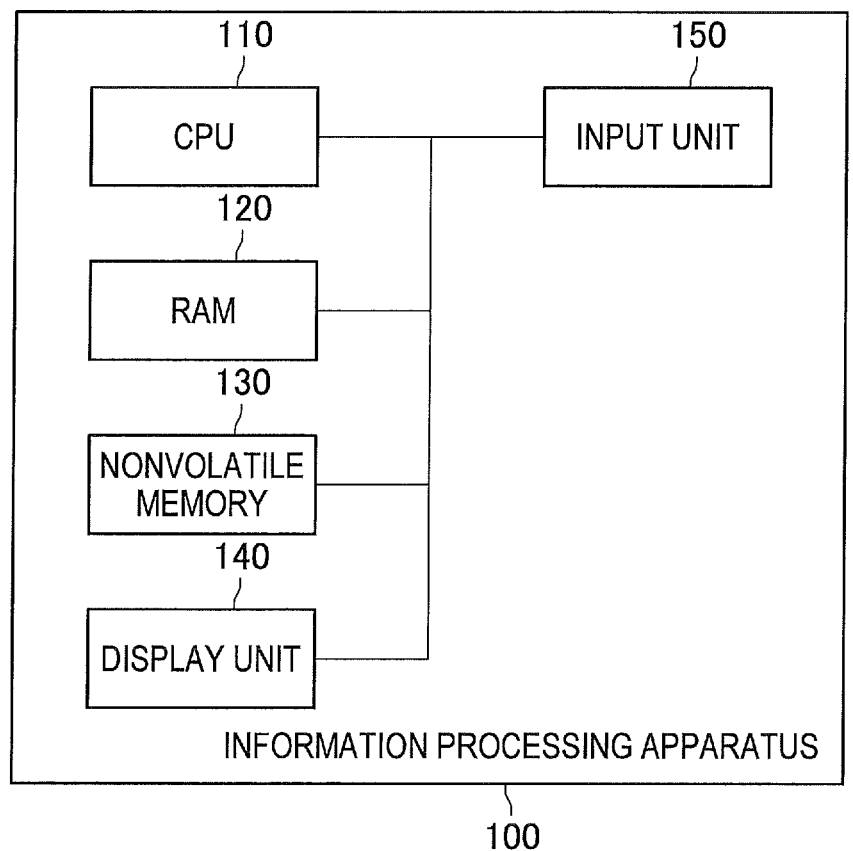
FIG. 2 is a diagram illustrating a hardware configuration of the information processing apparatus.

Next, a configuration example of the information processing apparatus 100 will be described. FIG. 2 is a diagram illustrating a configuration of the information processing apparatus 100. As illustrated in FIG. 2, the information processing apparatus 100 includes, for example, a CPU 110, a RAM 120, a nonvolatile memory 130, a display unit 140 and an input unit 150.

The nonvolatile memory 130 is a data storage unit included in the information processing apparatus 100 as an example of a storage part, and includes, for example, a magnetic storage device such as an HDD (Hard Disk Drive), a semiconductor storage device, an optical storage device, a magneto-optical storage device or the like. The nonvolatile memory 130 stores programs executed by the CPU 110 and various data used during execution of the programs.

The RAM 120 stores programs executed by the CPU 110 and parameters and the like used during execution of the programs.

The CPU 110 functions as an arithmetic processing unit and a control unit to control all or part of operations performed in the information processing apparatus 100 based on various programs recorded in the nonvolatile memory 130 and the RAM 120. The CPU 110 is included as an example of a control part of the information processing apparatus 100.

The display unit 140 includes a unit that can visually inform a user of information such as an LCD (Liquid Crystal Display), an organic EL (Electroluminescence) display unit or the like, for example. The display unit 140 outputs a resultant obtained by various types of processing performed by the information processing apparatus 100, for example. In particular, the display unit 140 displays the resultant obtained by the various types of processing performed by the information processing apparatus 100 as a text or an image.

The input unit 150 outputs an operation accepted from the user to the CPU 110 as signals. The user of the information processing apparatus 100 can input various data to the information processing apparatus 100 or issue an instruction of a processing operation to the information processing apparatus 100 by operating the input unit 150. The input unit 150 includes a touch panel, for example, but the type of the input unit 150 is not limited. The input unit 150 may include a device such as a mouse, a keyboard, an input interface based on gesture recognition or the like, for example.

Figure 3:
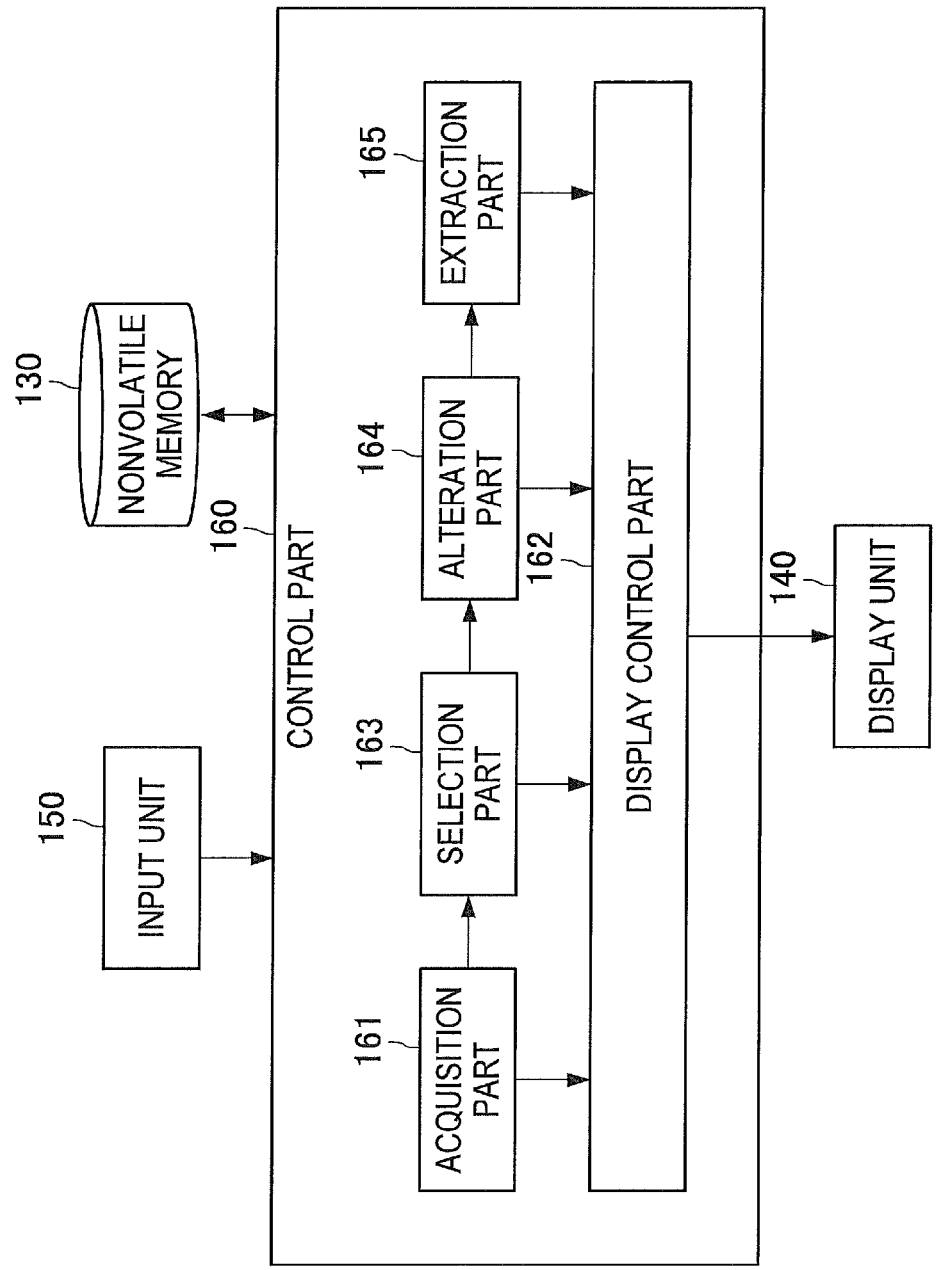
FIG. 3 is a diagram illustrating a functional configuration of the information processing apparatus.

FIG. 3 is a diagram illustrating a functional configuration of the information processing apparatus 100. As illustrated in FIG. 3, the information processing apparatus 100 includes a control part 160, and the control part 160 includes an acquisition part 161, a display control part 162, a selection part 163, an alteration part 164 and an extraction part 165. As illustrated in FIG. 3, the nonvolatile memory 130, the input unit 150 and the display unit 140 may be included in the information processing apparatus 100, but may be provided outside the information processing apparatus 100.

The acquisition part 161 acquires graphic data. The graphic data typically includes one or more than one line segments, but may include a curved segment in addition to the line segment. Alternatively, the graphic data may include the curved segment instead of the line segment. The curved segment may be a circle, an ellipse, or a part of the circle or the ellipse, for example. The graphic data may be embedded in a program executed by the CPU 110, or may be recorded on the nonvolatile memory 130.

The information processing apparatus 100 can provide various functions based on the graphic data acquired by the acquisition part 161. Examples of the functions of the information processing apparatus 100 will be described below. FIG. 4 through FIG. 10 are diagrams explanatory of the functions of the information processing apparatus 100.

Figure 4:
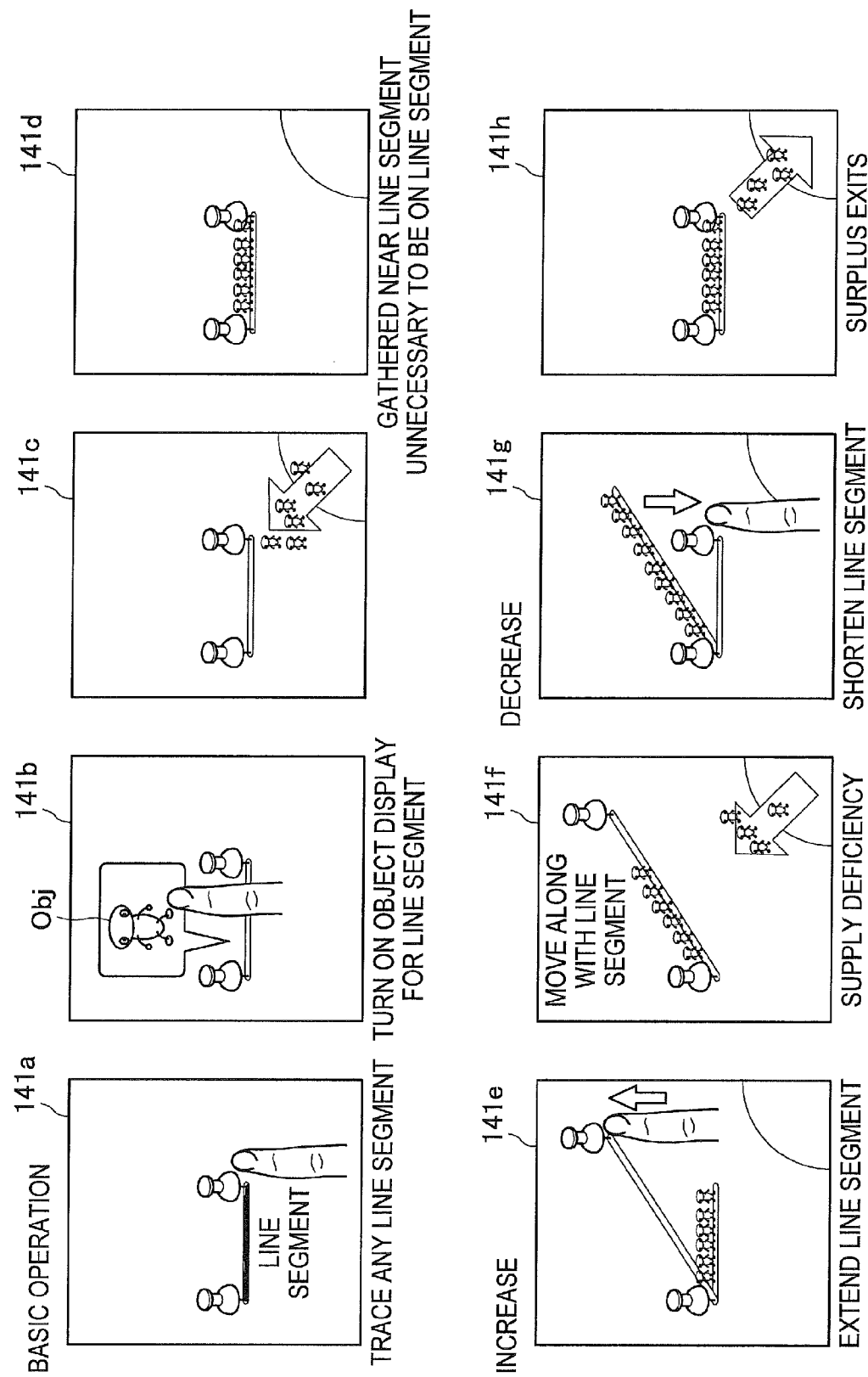
FIG. 4 is a diagram explanatory of an example of a function of the information processing apparatus.

FIG. 4 illustrates a basic operation (basic operation based on a length of the line segment) performed by the information processing apparatus 100. As illustrated in FIG. 4, the display control part 162 controls the graphic data acquired by the acquisition part 161 so as to be displayed by the display unit 140. As illustrated in FIG. 4, a screen 141a including the line segments as the graphic data is displayed, for example. When the user performs a designation operation (operation tracing the line segment, for example) on the input unit 150 to designate the line segment as all or part of the graphic data, the display control part 162 controls, based on the designation operation, display of a selection screen for selecting turning on or off of the display of an object Obj corresponding to the designated line segment. In FIG. 4, a screen 141b illustrates an example of the selection screen.

When the user performs an operation for turning on the display of the object Obj on the line segment on the input unit 150, the display control part 162 controls the object Obj to be displayed by the display unit 140. At this time, the display control part 162 controls the object Obj to be displayed in a quantity corresponding to a length of the line segment, for example. In FIG. 4, a screen 141c illustrates an example of a screen on which six objects are in the process of moving onto the line segment, and a screen 141d illustrates an example of a screen displayed at the completion of moving. Locations on which the objects Obj are displayed are not limited to on the line segment but may be other locations corresponding to the line segment such as locations near the line segment.

Here, when the user performs an operation for extending the line segment on the input unit 150, the display control part 162 controls the line segment to be extended based on the operation. In FIG. 4, a screen 141e illustrates an example of a screen on which the extended line segment is displayed. Subsequently, when the user completes the operation for extending the line segment, for example, the display control part 162 controls the object Obj to be displayed in a quantity corresponding to a length of the extended line segment. In FIG. 4, a screen 141f illustrates an example of a screen on which three objects are in the process of moving toward the line segment.

Subsequently, when the user performs an operation for shortening the line segment on the input unit 150, the display control part 162 controls the line segment to be shortened based on the operation. In FIG. 4, a screen 141g illustrates an example of a screen on which the shortened line segment is displayed. Subsequently, when the user completes the operation for shortening the line segment, for example, the display control part 162 controls the object Obj to be displayed in quantity corresponding to the length of the shortened line segment. In FIG. 4, a screen 141h illustrates an example of a screen on which three objects are in the process of moving away from the line segment.

As the examples illustrated in FIG. 4, the information processing apparatus 100 controls the object to be displayed in a quantity corresponding to a magnitude of a parameter (e.g., line segment length) extracted from the graphic data. Accordingly, the user can intuitively understand the magnitude of the parameter.

Figure 5:
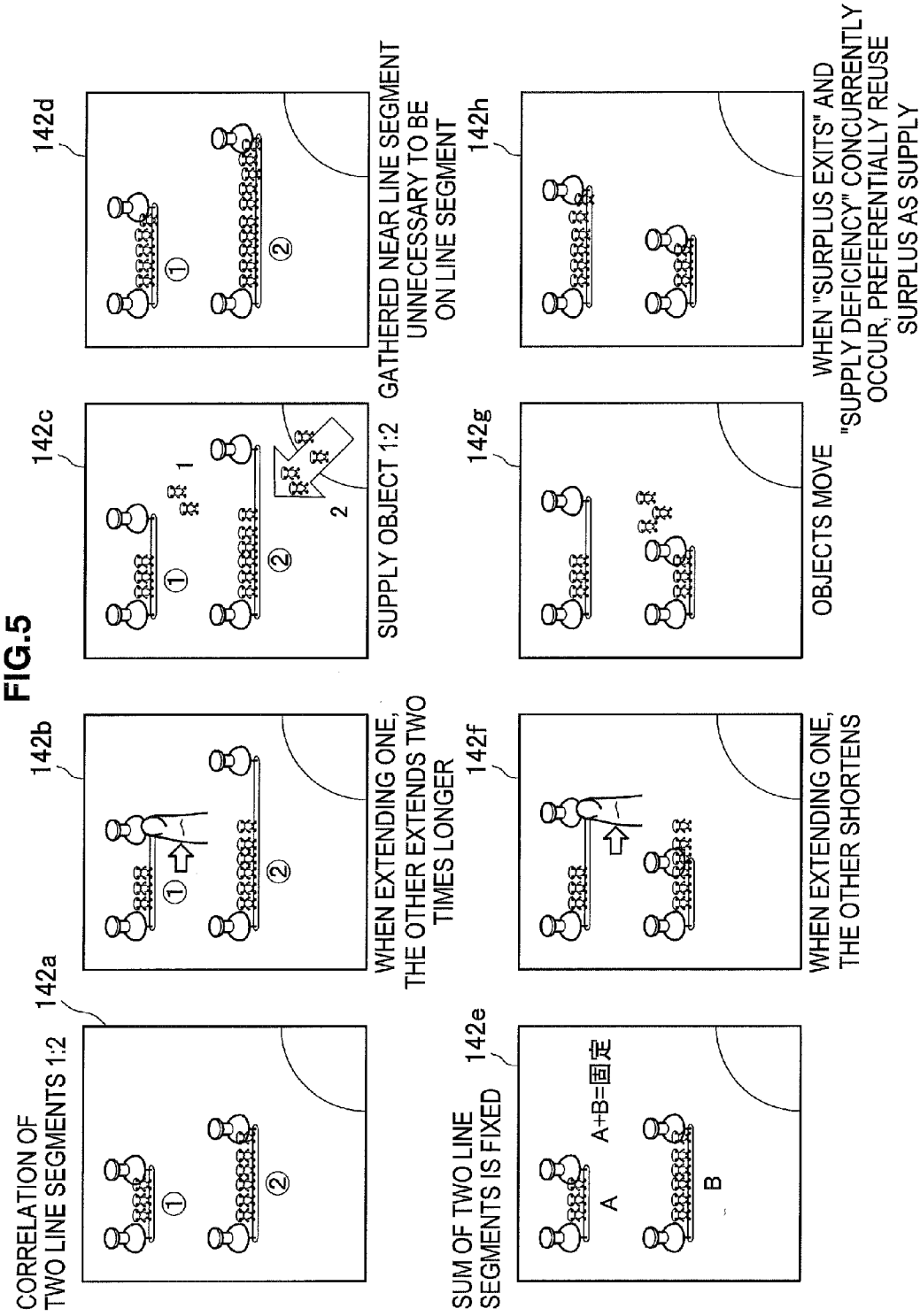
FIG. 5 is a diagram explanatory of an example of a function of the information processing apparatus.

FIG. 5 illustrates in the upper column operations in a case of a correlation such that a length ratio of two line segments included in the graphic data is 1 to 2. As illustrated in the upper column of FIG. 5, the display control part 162 controls graphic data acquired by the acquisition part 161 to be displayed by the display unit 140. As illustrated in the upper column of FIG. 5, a screen 142a including, for example, two line segments as the graphic data is displayed.

In addition, the display control part 162 controls the object to be displayed by the display unit 140. At this time, the display control part 162 controls the object to be displayed in a quantity corresponding to a length of the line segment, for example. In the upper column of FIG. 5, a screen 142a illustrates an example of a screen on which three objects exist on a first line segment and six objects exist on a second line segment. Locations on which the objects are displayed are not limited to on the line segment but may be other locations corresponding to the line segment such as locations near the line segment.

Here, when the user performs an operation for extending the first line segment on the input unit 150, the display control part 162 controls the first line segment to be extended based on the operation. In the upper column of FIG. 5, a screen 142b illustrates an example of a screen on which the extended first line segment is displayed. At this time, the selection part 163 selects a parameter from the graphic data. In an example illustrated in the upper column of FIG. 5, the alteration part 164 alters all or part of the graphic data based on the move operation. The selection part 163 selects the extended first line segment as a parameter varying in association with alteration of the location performed by the alteration part 164.

The extraction part 165 extracts a parameter having a correlation with the parameter selected by the selection part 163. For example, a correlation between parameters (as to an example illustrated in FIG. 5 upper column, the correlation is such a relation that a length ratio of the first line segment to the second line segment is 1 to 2) may be embedded in a program executed by the CPU 110, or may be recorded on the nonvolatile memory 130. The display control part 162 controls a length of the second line segment to be two times longer than the length of the first line segment. In the upper column of FIG. 5, a screen 142b illustrates an example of a screen on which the extended two line segments are displayed.

Subsequently, when the user completes the operation for extending the first line segment, for example, the display control part 162 controls the object to be displayed on the first line segment in a quantity corresponding to a length of the extended first line segment. In addition, the display control part 162 controls the object to be displayed on 1 the second line segment in a quantity based on the correlation. In the upper column of FIG. 5, a screen 142c illustrates an example of a screen on which two objects are in the process of moving toward the first line segment and four objects are in the process of moving toward the second line segment. Further, a screen 142d illustrates an example of a screen at the completion of moving.

FIG. 5 illustrates in the lower column operations in a case where two line segments included in the graphic data have a correlation such that a sum of the lengths of two line segments is constant. As illustrated in the lower column of FIG. 5, the display control part 162 controls the graphic data acquired by the acquisition part 161 to be displayed by the display unit 140. As illustrated in the lower column of FIG. 5, a screen 142e including, for example, two line segments as the graphic data is displayed.

Further, the display control part 162 controls objects to be displayed by the display unit 140. At this time, the display control part 162 controls the object to be displayed in a quantity corresponding to the length of the line segment, for example. In the lower column of FIG. 5, a screen 142e illustrates an example of a screen on which three objects exist on the line segment A and six objects exist on the line segment B. Locations on which the objects are displayed are not limited to on the line segment but may be other locations corresponding to the line segment such as locations near the line segment.

Here, when the user performs an operation for extending the line segment A on the input unit 150, the display control part 162 controls the line segment A to be extended based on the operation. In the lower column of FIG. 5, a screen 142f illustrates an example of a screen on which the extended line segment is displayed. At this time, the selection part 163 selects a parameter from the graphic data. In the example illustrated in the lower column of FIG. 5, the selection part 163 selects the extended line segment A as the parameter.

The extraction part 165 extracts a parameter having a correlation with the parameter selected by the selection part 163. For example, a correlation between parameters (as to an example illustrated in FIG. 5 lower column, a correlation is such a relation that the sum of lengths of the line segment A and the line segment B is constant) may be embedded in a program executed by the CPU 110, or may be recorded on the nonvolatile memory 130. The display control part 162 controls the length of the line segment B to be a length obtained by subtracting the length of the line segment A from a fixed value. In the lower column of FIG. 5, a screen 142f illustrates an example of a screen on which the line segment A and the line segment B both altered in length are displayed.

Subsequently, when the user completes the operation for extending the line segment, for example, the display control part 162 controls the object to be displayed on the line segment A in a quantity corresponding to the length of the line segment A extended in length. In addition, the display control part 162 controls objects to be displayed on the line segment B in a quantity based on the correlation. In the lower column of FIG. 5, a screen 142g illustrates an example of a screen on which three objects are in the process of moving from the line segment A toward the line segment B. Further, a screen 142h illustrates an example of a screen at the completion of moving.

As described above, the examples illustrated in the upper column of FIG. 5 represent a relation such that a magnitude of a parameter selected by the selection part 163 is proportional to a magnitude of a parameter extracted by the extraction part 165. The examples illustrated in the lower column of FIG. 5 represent a relation such that a sum of a magnitude of a parameter selected by the selection part 163 and a magnitude of a parameter extracted by the extraction part 165 is constant. As examples illustrated in FIG. 5, the information processing apparatus 100 controls the objects to be displayed based on a correlation between a plurality of parameters (e.g., line segment length) extracted from the graphic data. Accordingly, the user can intuitively understand the correlation between multiple parameters extracted from the graphic data.

Figure 6:
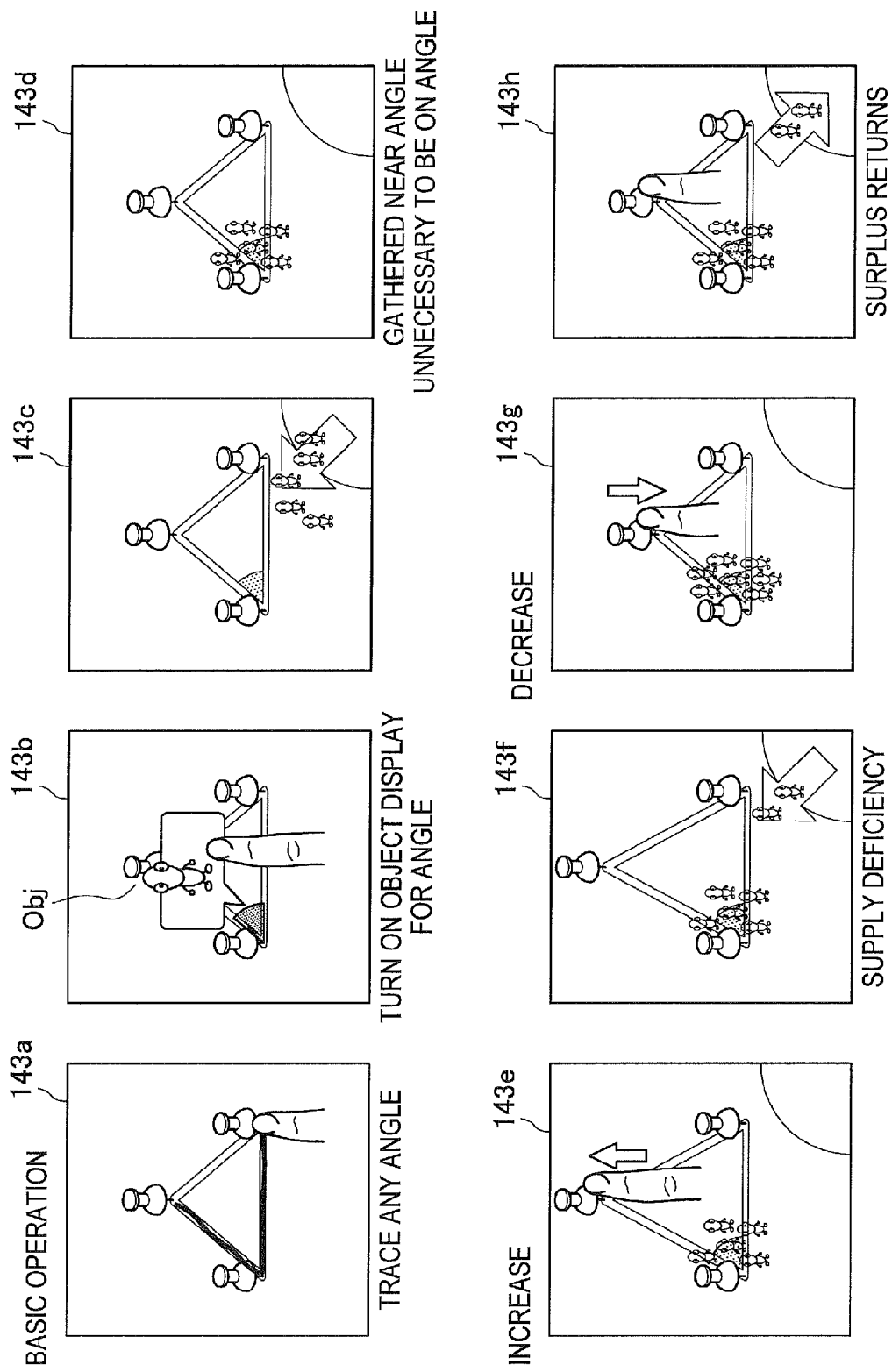
FIG. 6 is a diagram explanatory of an example of a function of the information processing apparatus.

FIG. 6 illustrates a basic operation (basic operation based on angles) performed by the information processing apparatus 100. As illustrated in FIG. 6, the display control part 162 controls the graphic data acquired by the acquisition part 161 to be displayed by the display unit 140. As illustrated in FIG. 6, a screen 143a including a triangle, for example, as the graphic data is displayed. When the user performs an operation (operation tracing an angle, for example) for designating an angle as all or part of the graphic data on the input unit 150, the display control part 162 controls, based on the designation operation, display of a selection screen for selecting turning on or off of display of an object Obj corresponding to the designated angle. In FIG. 6, a screen 143b illustrates an example of the selection screen.

When the user performs an operation for turning on the display of the object Obj on an angle on the input unit 150, the display control part 162 controls the object Obj to be displayed by the display unit 140. At this time, the display control part 162 controls the object Obj to be displayed in a quantity corresponding to a magnitude of the angle, for example. In the upper column of FIG. 6, a screen 143c illustrates an example of a screen on which five objects are in the process of moving to an angle, and a screen 143d illustrates an example of a screen displayed at the completion of moving. Locations on which the objects Obj are displayed are not limited to on the angle but may be other locations corresponding to the angle such as locations near the angle.

Here, when the user performs an operation for expanding an angle on the input unit 150, the display control part 162 controls the angle to be expanded based on the operation. In the lower column of FIG. 6, a screen 143e illustrates an example of a screen on which the expanded angle is displayed. Subsequently, when the user completes the operation for expanding the angle, for example, the display control part 162 controls the object Obj to be displayed on the angle in a quantity corresponding to a magnitude of the expanded angle. In the lower column of FIG. 6, a screen 143f illustrates an example of a screen on which two objects are in the process of moving to the angle.

Subsequently, when the user performs an operation for reducing the angle on the input unit 150, the display control part 162 controls the angle to be reduced based on the operation. In the lower column of FIG. 6, a screen 143g illustrates an example of a screen on which the reduced angle is displayed. Subsequently, when the user completes the operation for reducing the angle, for example, the object Obj is controlled to be displayed in a quantity corresponding to the magnitude of the reduced angle. In the lower column of FIG. 6, a screen 143h illustrates an example of a screen on which two objects are in the process of moving away from the angle.

As the examples illustrated in FIG. 6, the information processing apparatus 100 controls the object to be displayed in a quantity corresponding to a magnitude of a parameter (e.g., angle magnitude) extracted from the graphic data. Accordingly, the user can intuitively understand the magnitude of the parameter.

Figure 7:
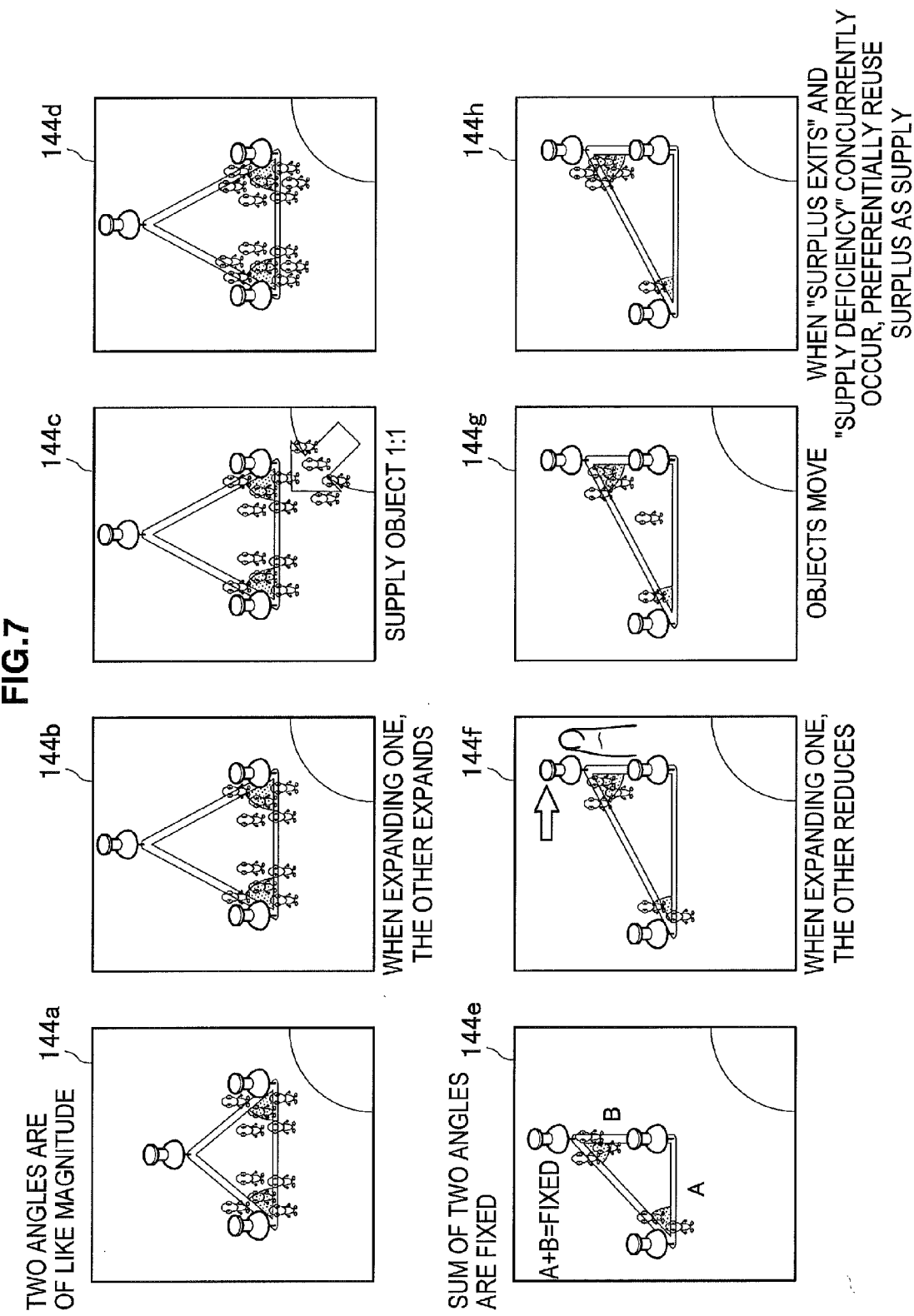
FIG. 7 is a diagram explanatory of an example of a function of the information processing apparatus.

FIG. 7 illustrates in the upper column operations in a case of a correlation such that a ratio of two angles included in the graphic data is 1 to 1. As illustrated in the upper column of FIG. 7, the display control part 162 controls the graphic data acquired by the acquisition part 161 to be displayed by the display unit 140. As illustrated in the upper column of FIG. 7, a screen 144a including, for example, two angles as the graphic data is displayed.

In addition, the display control part 162 controls the object to be displayed by the display unit 140. At this time, the display control part 162 controls the object to be displayed in a quantity corresponding to a magnitude of the angle, for example. In the upper column of FIG. 7, a screen 144a illustrates an example of a screen on which five objects exist at each of two angles. Locations on which the objects are displayed are not limited to on the angle but may be other locations corresponding to the angle such as locations near the angle.

Here, when the user performs an operation for expanding a first angle on the input unit 150, the display control part 162 controls the first angle to be expanded based on the operation. In the upper column of FIG. 7, a screen 144b illustrates an example of a screen on which the expanded first angle is displayed. At this time, the selection part 163 selects parameters from the graphic data. In an example illustrated in the upper column of FIG. 7, the alteration part 164 alters all or part of the graphic data based on the move operation. The selection part 163 selects the expanded first angle as a parameter varying in association with alteration of the location performed by the alteration part 164.

The extraction part 165 extracts a parameter having a correlation with the parameter selected by the selection part 163. For example, a correlation between parameters (as to an example illustrated in FIG. 7 upper column, the correlation is such a relation that a magnitude ratio of the first angle to the second angle is 1 to 1) may be embedded in a program executed by the CPU 110, or may be recorded on the non-volatile memory 130. The display control part 162 controls a magnitude of the second angle to be the same as the magnitude of the first angle. In the upper column of FIG. 7, a screen 144b illustrates an example of a screen on which the expanded two angles are displayed.

Subsequently, when the user completes the operation for expanding the first angle, for example, the display control part 162 controls the object to be displayed at the first angle in a quantity corresponding to a magnitude of the expanded first angle. In addition, the display control part 162 controls the object to be displayed at the second angle in a quantity based on the correlation. In the upper column of FIG. 7, a screen 144c illustrates an example of a screen on which two objects are in the process of moving toward the first angle and two objects are in the process of moving toward the second angle. Further, a screen 144d illustrates an example of a screen at the completion of moving.

FIG. 7 illustrates in the lower column operations in a case where two angles included in the graphic data have a correlation such that a sum of the magnitudes of two angles is constant. As illustrated in the lower column of FIG. 7, the display control part 162 controls the graphic data acquired by the acquisition part 161 to be displayed by the display unit 140. As illustrated in the lower column of FIG. 7, a screen 144e including, for example, two angles as the graphic data is displayed.

Further, the display control part 162 controls objects to be displayed by the display unit 140. At this time, the display control part 162 controls the object to be displayed in a quantity corresponding to the magnitude of the angle, for example. In the lower column of FIG. 7, a screen 144e illustrates an example of a screen on which two objects exist on the angle A and three objects exist on the angle B. Locations on which the objects are displayed are not limited to on the angle but may be other locations corresponding to the angle such as locations near the angle.

Here, when the user performs an operation for expanding the angle B on the input unit 150, the display control part 162 controls the angle B to be expanded based on the operation. In the lower column of FIG. 7, a screen 144f illustrates an example of a screen on which the expanded angle is displayed. At this time, the selection part 163 selects a parameter from the graphic data. In the example illustrated in the lower column of FIG. 7, the selection part 163 selects the expanded angle B as the parameter.

The extraction part 165 extracts a parameter having a correlation with the parameter selected by the selection part 163. For example, a correlation between parameters (as to an example illustrated in FIG. 7 lower column, a correlation is such a relation that the sum of magnitudes of the angle A and the angle B is constant) may be embedded in a program executed by the CPU 110, or may be recorded on the non-volatile memory 130. The display control part 162 controls the magnitude of the angle A to be a magnitude obtained by subtracting the magnitude of the angle B from a fixed value. In the lower column of FIG. 7, a screen 144f illustrates an example of a screen on which the angle A and the angle B both altered in magnitude are displayed.

Subsequently, when the user completes the operation for expanding the angle B, for example, the display control part 162 controls the object to be displayed on the angle B in a quantity corresponding to the magnitude of the angle B expanded in magnitude. In addition, the display control part 162 controls objects to be displayed on the angle A in a quantity based on the correlation. In the lower column of FIG. 7, a screen 144g illustrates an example of a screen on which one object is in the process of moving from the angle A toward the angle B. Further, a screen 144h illustrates an example of a screen at the completion of moving.

As described above, the examples illustrated in the upper column of FIG. 7 represent a relation such that a magnitude of a parameter selected by the selection part 163 is proportional (especially 1 to 1) to a magnitude of a parameter extracted by the extraction part 165. The examples illustrated in the lower column of FIG. 7 represent a relation such that a sum of a magnitude of a parameter selected by the selection part 163 and a magnitude of a parameter extracted by the extraction part 165 is constant. As examples illustrated in FIG. 7, the information processing apparatus 100 controls the objects to be displayed based on a correlation between multiple parameters (e.g., angle magnitudes) extracted from the graphic data. Accordingly, the user can intuitively understand the correlation between multiple parameters extracted from the graphic data.

Figure 8:
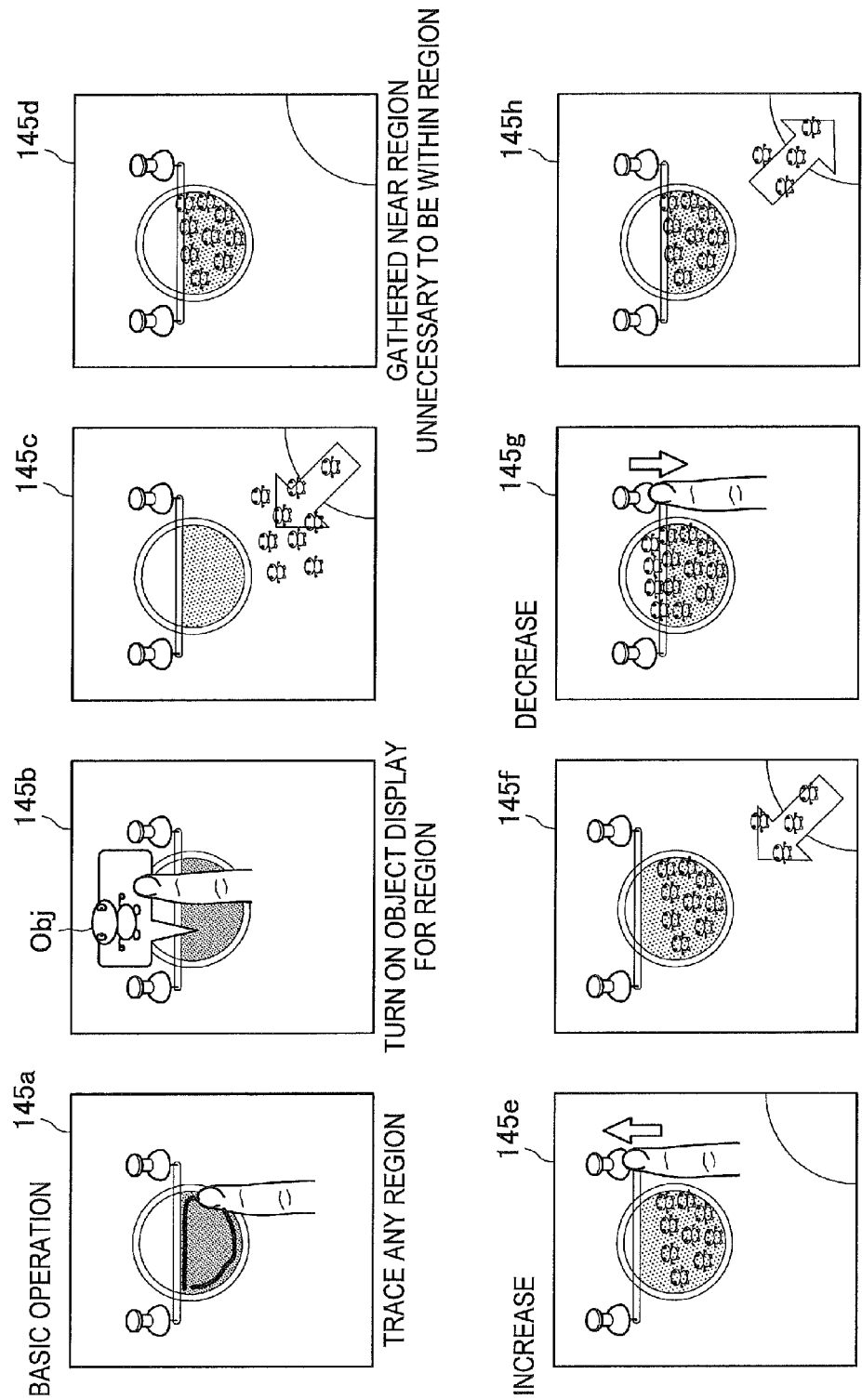
FIG. 8 is a diagram explanatory of an example of a function of the information processing apparatus.

FIG. 8 illustrates a basic operation (basic operation based on an area size) performed by the information processing apparatus 100. As illustrated in FIG. 8, the display control part 162 controls the graphic data acquired by the acquisition part 161 to be displayed by the display unit 140. As illustrated in FIG. 8, a screen 145a including a circle and a line segment, for example, as the graphic data is displayed. When the user performs an operation (operation tracing an outline of an area, for example) for designating the area as all or part of the graphic data on the input unit 150, the display control part 162 controls, based on the designation operation, display of a selection screen for selecting turning on or off of display of an object Obj corresponding to the designated area. In FIG. 8, a screen 145b illustrates an example of the selection screen.

When the user performs an operation for turning on the display of the object Obj on an area on the input unit 150, the display control part 162 controls the object Obj to be displayed by the display unit 140. At this time, the display control part 162 controls the object Obj to be displayed in a quantity corresponding to a size of the area, for example. In FIG. 8, a screen 145c illustrates an example of a screen on which nine objects are in the process of moving to the area, and a screen 145d illustrates an example of a screen displayed at the completion of moving. Locations on which the objects Obj are displayed are not limited to on the area but may be other locations corresponding to the area such as locations near the area.

Here, when the user performs an operation for expanding the area on the input unit 150, the display control part 162 controls the area to be expanded based on the operation. In FIG. 8, a screen 145e illustrates an example of a screen on which the expanded area is displayed. Subsequently, when the user completes the operation for expanding the area, for example, the display control part 162 controls the object Obj to be displayed on the area in a quantity corresponding to the size of the expanded area. In FIG. 8, a screen 145f illustrates an example of a screen on which four objects are in the process of moving to the area.

Subsequently, when the user performs an operation for reducing the area on the input unit 150, the display control part 162 controls the area to be reduced based on the operation. In FIG. 8, a screen 145g illustrates an example of a screen on which the reduced area is displayed. Subsequently, when the user completes the operation for reducing the area, for example, the object Obj is controlled to be displayed in a quantity corresponding to the size of the reduced area. In FIG. 8, a screen 145h illustrates an example of a screen on which four objects are in the process of moving away from the area.

As the examples illustrated in FIG. 8, the information processing apparatus 100 controls the object to be displayed in a quantity corresponding to a magnitude of a parameter (e.g., area size) extracted from the graphic data. Accordingly, the user can intuitively understand the magnitude of the parameter.

Figure 9:
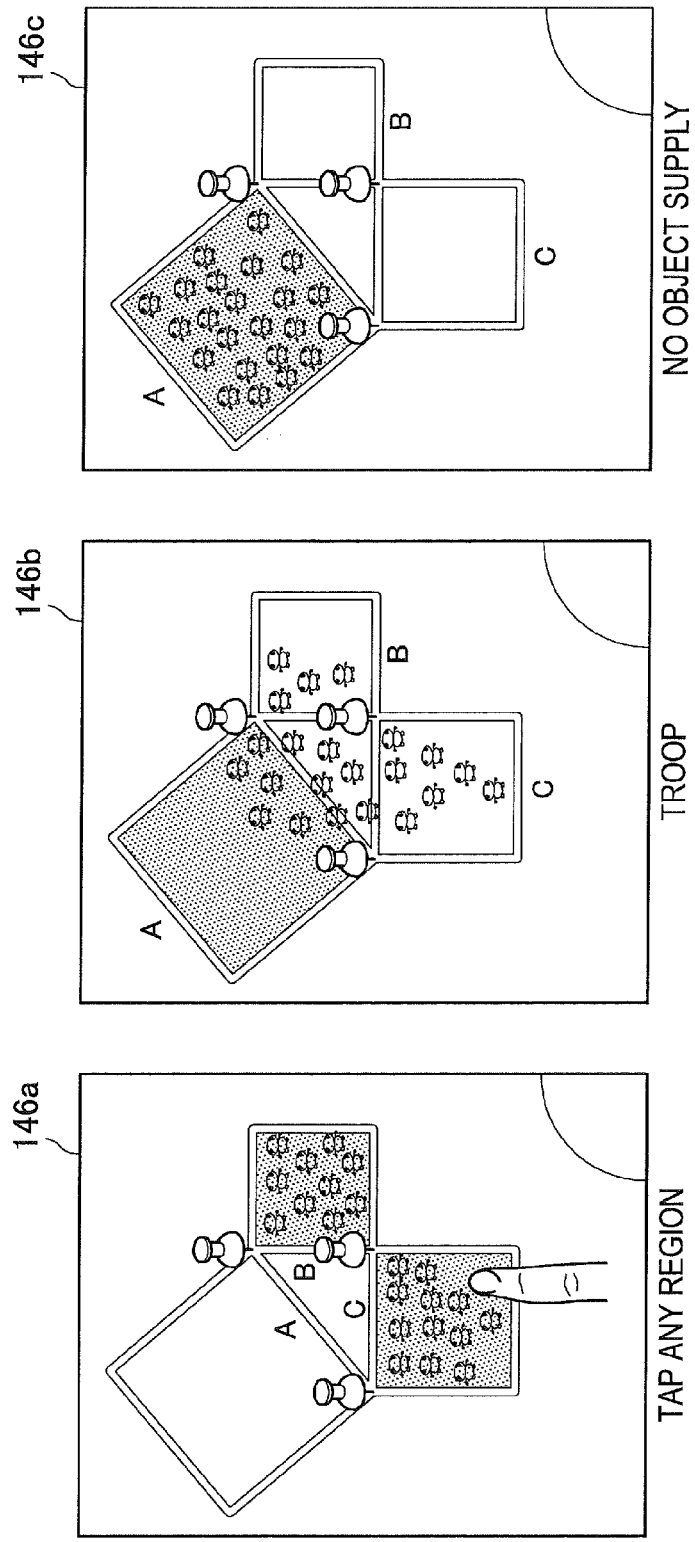
FIG. 9 is a diagram explanatory of an example of a function of the information processing apparatus.

FIG. 9 illustrates operations in a case of a correlation such that three line segments included in the graphic data form a right triangle. As illustrated in FIG. 9, the display control part 162 controls the graphic data acquired by the acquisition part 161 to be displayed by the display unit 140. As illustrated in FIG. 9, a screen 146a including three line segments forming a right triangle as the graphic data, for example, is displayed.

In addition, the display control part 162 controls the object to be displayed by the display unit 140. At this time, the display control part 162 controls the object to be displayed in a quantity corresponding to the size of the area, for example. In FIG. 9, a screen 146a illustrates an example of a screen on which ten objects exist in an area (a square built upon a line segment B) and twelve objects exist in an area (a square built upon a line segment C). Locations on which the objects are displayed are not limited to on the area but may be other locations corresponding to the area such as locations near the area.

Here, when the user performs a predetermined operation (operation tapping any area, for example) on the input unit 150 (or when a predetermined time period has elapsed), the selection part 163 selects parameters from the graphic data. In an example illustrated in FIG. 9, the selection part 163 selects as parameters the areas (the square built upon the line segment B and the square built upon the line segment C) on which the objects exist.

The extraction part 165 extracts a parameter having a correlation with the parameter selected by the selection part 163. For example, a correlation between parameters (as to an example illustrated in FIG. 9, the correlation is such a relation that an area of a square built upon a line segment A, and a sum of areas of the square built upon the line segment B and the square built upon the line segment C are equal) may be embedded in a program executed by the CPU 110, or may be recorded on the nonvolatile memory 130.

Subsequently, the display control part 162 controls the object to be displayed in a quantity based on the correlation. In FIG. 9, a screen 146b illustrates an example of a screen on which all the objects existing in the square built upon the line segment B and the square built upon the line segment C are in the process of moving toward the square built upon the line segment A. Further, a screen 146c illustrates an example of a screen at the completion of moving.

As described above, the example illustrated in FIG. 9 represents a relation such that a magnitude of a parameter selected by the selection part 163 is equal to a magnitude of a parameter extracted by the extraction part 165. Accordingly, the user can intuitively understand the correlation between multiple parameters extracted from the graphic data. Specifically, according to the example illustrated in FIG. 9, the user can understand the Pythagorean theorem based on a concrete phenomenon.

Figure 10:
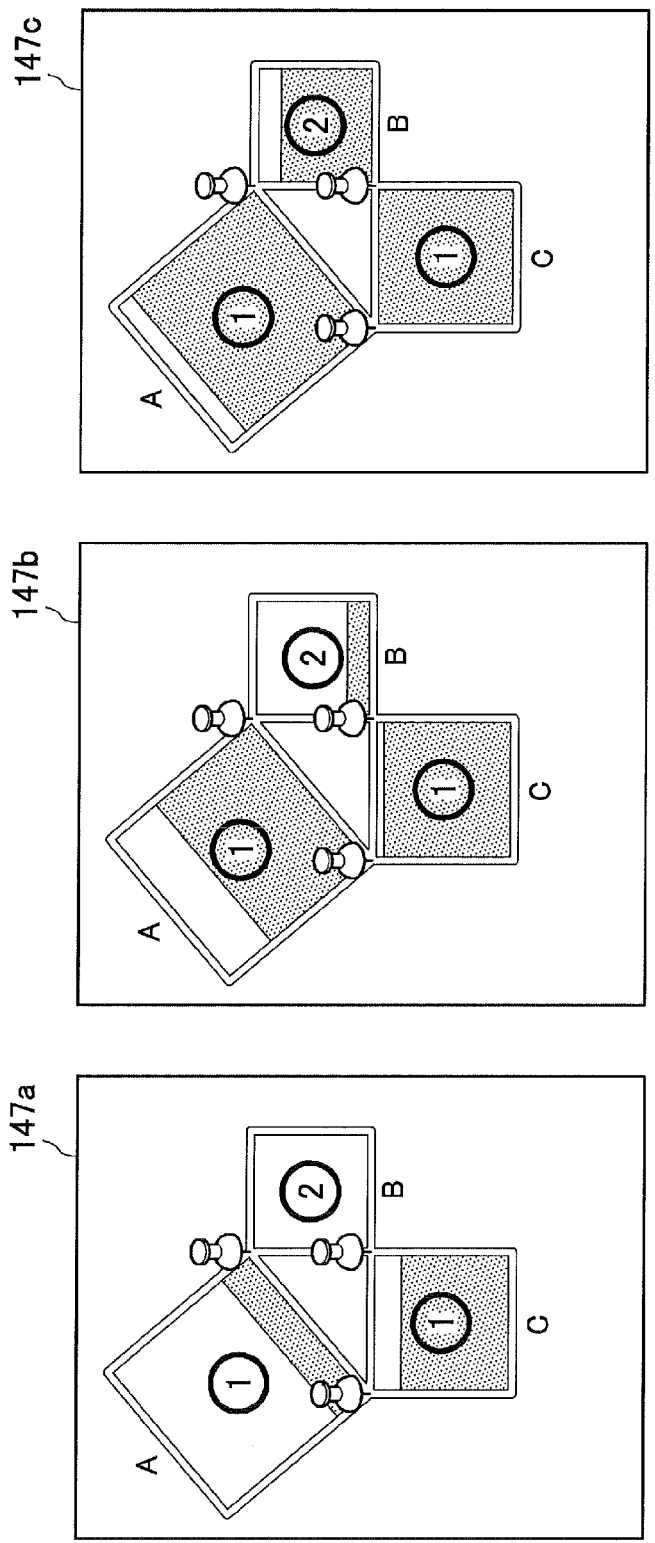
FIG. 10 is a diagram explanatory of an example of a function of the information processing apparatus.

FIG. 10 illustrates, similar to the case illustrated in FIG. 9, an operation in a case of a correlation such that three line segments included in the graphic data form a right triangle. The example illustrated in FIG. 10 can be applied to a case of an object not represented by an integer value such as water. As illustrated in FIG. 10, the display control part 162 controls the graphic data acquired by the acquisition part 161 to be displayed by the display unit 140. As illustrated in FIG. 10, for example, a screen 147a including three line segments forming a right triangle as graphic data is displayed.

In addition, the display control part 162 controls the object to be displayed by the display unit 140. At this time, the display control part 162 controls the object to be displayed in a quantity corresponding to the size of the area, for example. In FIG. 10, a screen 147a illustrates an example of a screen on which objects having same quantities with each other respectively exist in an area (a square built upon a line segment A) and in an area (a square built upon a line segment C). Locations on which the objects are displayed are not limited to on the area but may be other locations corresponding to the area such as locations near the area.

Here, when the user performs a predetermined operation (operation tapping any area, for example) on the input unit 150 (or when a predetermined time period has elapsed), the selection part 163 selects parameters from the graphic data. In an example illustrated in FIG. 10, the selection part 163 selects as parameters the areas (the square built upon the line segment A and the square built upon the line segment C) on which the objects exist.

The extraction part 165 extracts a parameter having a correlation with the parameter selected by the selection part 163. For example, a correlation between parameters (as to an example illustrated in FIG. 10, the correlation is such a relation that an area of the square built upon a line segment A, and a sum of areas of the square built upon the line segment B and the square built upon the line segment C are equal) may be embedded in a program executed by the CPU 110, or may be recorded on the nonvolatile memory 130.

Subsequently, the display control part 162 controls the object to be displayed in a quantity based on the correlation. In FIG. 10, a screen 147b illustrates an example of a screen on which quantities of the objects are in the process of increasing such that the sum of both objects existing in the square built upon the line segment B and the square built upon the line segment C, and the object existing in the square built upon the line segment A become equal in a quantity. Further, a screen 147c illustrates an example of a screen at the completion of increasing.

As described above, the example illustrated in FIG. 10 represents a relation such that a magnitude of a parameter selected by the selection part 163 is equal to a magnitude of a parameter extracted by the extraction part 165. Accordingly, the user can intuitively understand the correlation between multiple parameters extracted from the graphic data. Specifically, according to the example illustrated in FIG. 10, the user can understand the Pythagorean theorem based on a concrete phenomenon, similar to the case illustrated in FIG. 9.

1-3. Information Processing Apparatus Operation Flow

Figure 11:
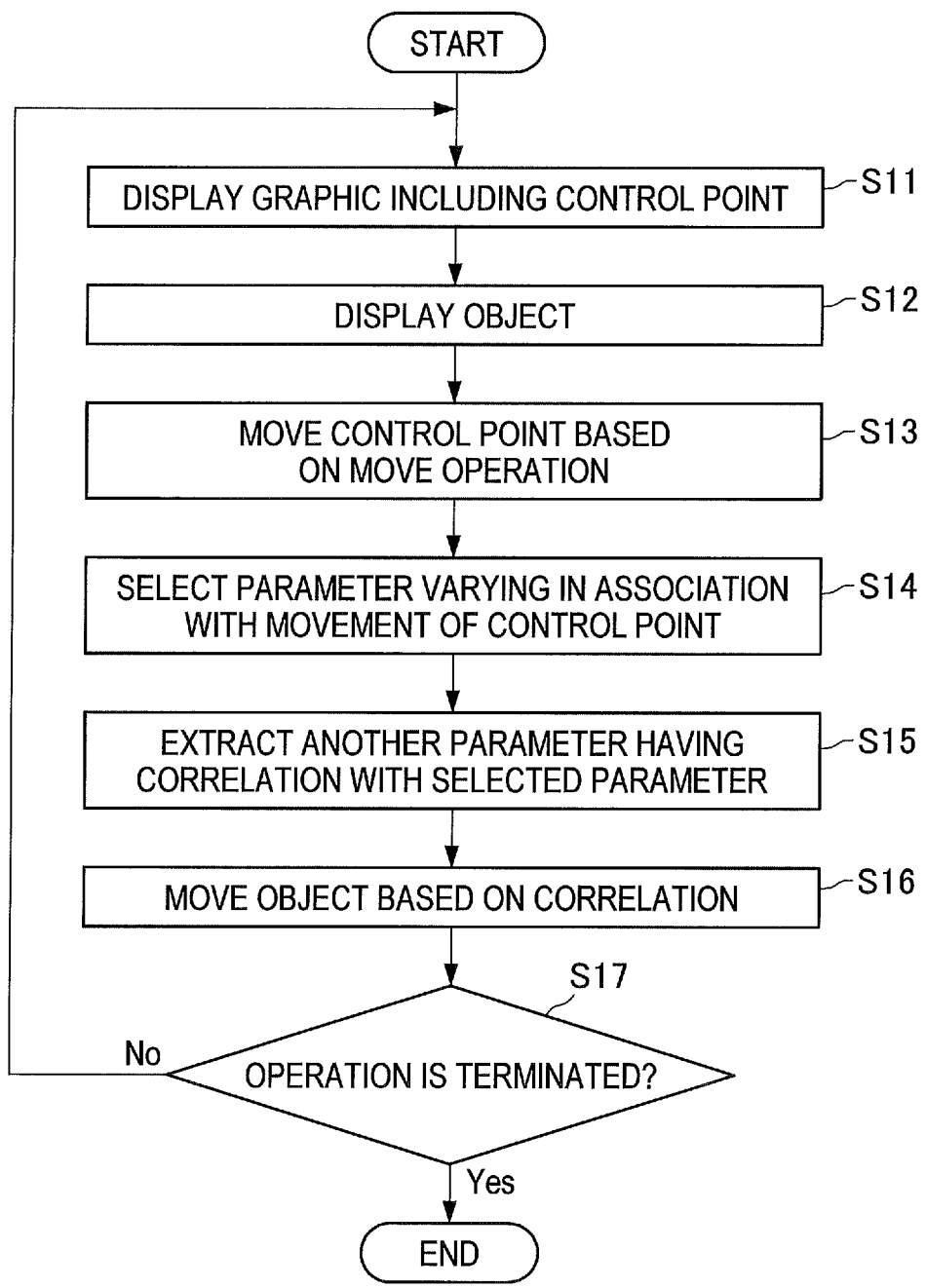
FIG. 11 is a flowchart illustrating an example of an operation flow of the information processing apparatus.

FIG. 11 is a flowchart illustrating an example of an operation flow of the information processing apparatus 100. At first, the display control part 162 controls a graphic including control points to be displayed (step S11). The acquisition part 161 can acquire the graphic. Subsequently, the display control part 162 controls objects to be displayed (step S12). The alteration part 164 moves the control point based on a moving operation whose input is accepted by the input unit 150 (step S13).

The selection part 163 selects parameters varying in association with movement of the control point (step S14). The extraction part 165 extracts another parameter having a correlation with the parameter selected by the selection part 163 (step S15). The display control part 162 moves the object based on the correlation (step S16). When the operation is terminated ("Yes" in step S17), the operation is terminated, but when the operation is continued ("No" in step S17), the operation returns to step S11 to be continued.

2. CONCLUSION

According to the embodiment of the present disclosure, the objects are controlled to be displayed in a quantity corresponding to the magnitude of the parameter extracted from the graphic data. Accordingly, the user can intuitively understand the magnitude of the parameter. Further, according to the embodiment, the parameter is selected from the graphic data, and the object corresponding to the selected parameter is displayed. Still further, the parameter having the correlation with the selected parameter is extracted, and the object is moved based on the correlation. Accordingly, the correlation between multiple parameters extracted from the graphic data can be intuitively understood.

The relation established based on the Pythagorean theorem, for example, can be assumed as the correlations between the parameters as described above, but not limited to. The correlation may be a relation such that a magnitude of a circumferential angle is equal to a magnitude of a tangent chord angle, or a relation such that a magnitude of a circumferential angle is equal to half of a magnitude of a central angle. Alternatively, the correlation may be a relation such that a sum of magnitudes of opposing corner angles of a quadrangle inscribed in a circle is 180 degrees, or a relation established based on the alternate segment theorem. Alternatively, the correlation may be a relation such that when assuming that intersection points of a circle and a straight line are X1 and X2, and a foot of a perpendicular line from the center of the circle down to the straight line is H, a distance between H and X1 and a distance between H and X2 are equal.

Note that, a series of control processes performed by each unit described in an embodiment of the present disclosure may be implemented by any of software, hardware, or combination thereof. Programs constituting software are previously stored, for example, in a computer readable recording medium provided inside or outside each unit. Each program is read in a RAM (Random Access Memory) during execution, for example, and executed by a processor such as a CPU (Central Processing Unit) or the like.

It should be understood by those skilled in the art that various modifications, combinations, sub-combinations and alterations may occur depending on design requirements and other factors insofar as they are within the scope of the appended claims or the equivalents thereof.

Note that, the following designs may be within the scope of technology of the present disclosure.

(1) An information processing apparatus including:
a selection part selecting a parameter from graphic data;
a display control part controlling an object corresponding to the parameter selected by the selection part to be displayed; and
an extraction part extracting a parameter having a correlation with the parameter selected by the selection part,
wherein the display control part controls the object to be moved based on the correlation.

(2) The information processing apparatus according to (1), further including:
an alteration part altering a location of all or part of graphic data based on a moving operation performed by a user,
wherein the selection part selects a parameter varying in association with alteration of the location performed by the alteration part.

(3) The information processing apparatus according to (1) or (2), wherein the display control part controls an object to be displayed in a quantity corresponding to a magnitude of the parameter selected by the selection part on a location corresponding to the location of the parameter.

(4) The information processing apparatus according to any one of (1)-(3), wherein the correlation represents a relation that a magnitude of the parameter selected by the selection part is proportional to a magnitude of the parameter extracted by the extraction part.

(5) The information processing apparatus according to any one of (1)-(3), wherein the correlation represents a relation that a sum of a magnitude of the parameter selected by the selection part and a magnitude of the parameter extracted by the extraction part is constant.

(6) A program causing a computer to function as an information processing apparatus including:
a selection part selecting a parameter from graphic data;
a display control part controlling an object corresponding to the parameter selected by the selection part to be displayed; and
an extraction part extracting a parameter having a correlation with the parameter selected by the selection part,
wherein the display control part controls the object to be moved based on the correlation.

(7) The program according to (6),
wherein the information processing apparatus further includes an alteration part altering a location of all or part of graphic data based on a moving operation performed by a user, and
wherein the selection part selects a parameter varying in association with alteration of the location performed by the alteration part.

(8) The program according to (6) or (7), wherein the display control part controls an object to be displayed in a quantity corresponding to a magnitude of the parameter selected by the selection part on a location corresponding to the location of the parameter.

(9) The program according to any one of (6)-(8), wherein the correlation represents a relation that a magnitude of the parameter selected by the selection part is proportional to a magnitude of the parameter extracted by the extraction part.

(10) The program according to any one of (6)-(8), wherein the correlation represents a relation that a sum of a magnitude of the parameter selected by the selection part and a magnitude of the parameter extracted by the extraction part is constant.

(11) An information processing method including:
selecting a parameter from graphic data;
controlling an object corresponding to the parameter to be displayed;
extracting a parameter having a correlation with the parameter, and
controlling the object to be moved based on the correlation.

What is claimed is:

1. An information processing apparatus comprising:
a selection part to select a first parameter from graphic data;
a display control part to control a quantity of objects to be displayed; and
an extraction part to extract a second parameter having a correlation with the first parameter selected by the selection part,
the display control part controls the quantity of objects based on the correlation,
the selection part, the display control part, and the extraction part being arranged within a central processing unit (CPU), and
the first parameter is a changed length of a first line segment changed by a user and the second parameter is a second line segment which is different from the first line segment and which has the correlation with the first line segment, so that when the user changes a length of the first line segment the display control part automatically controls both (i) a length of the second line segment and (ii) the quantity of objects displayed in association with the first line segment and the second line segment, to be changed accordingly.

2. The information processing apparatus according to claim 1, further comprising:
an alteration part altering a location of all or part of graphic data based on a moving operation performed by a user,
wherein the selection part selects the first parameter which is variable in association with alteration of the location performed by the alteration part.

3. The information processing apparatus according to claim 1, wherein the display control part further controls the quantity of objects to be displayed based on a magnitude of the first parameter selected by the selection part on a location corresponding to the location of the first parameter.

4. The information processing apparatus according to claim 1, wherein the correlation represents a relation that a magnitude of the first parameter selected by the selection part is proportional to a magnitude of the second parameter extracted by the extraction part.

5. The information processing apparatus according to claim 1, wherein the correlation represents a relation that a sum of a magnitude of the first parameter selected by the selection part and a magnitude of the second parameter extracted by the extraction part is constant.

6. A non-transitory computer-readable medium having stored thereon a program causing a computer to function as an information processing apparatus comprising:
   a selection part selecting a first parameter from graphic data;
   a display control part controlling a quantity of objects to be displayed; and
   an extraction part extracting a second parameter having a correlation with the first parameter selected by the selection part,
   the display control part controls the quantity of objects based on the correlation, and
   the first parameter is a changed length of a first line segment changed by a user and the second parameter is a second line segment which is different from the first line segment and which has the correlation with the first line segment, so that when the user changes a length of the first line segment the display control part automatically controls both (i) a length of the second line segment and (ii) the quantity of objects displayed in association with the first line segment and the second line segment, to be changed accordingly.

7. The non-transitory computer-readable medium according to claim 6,
   wherein the information processing apparatus further includes an alteration part altering a location of all or part of graphic data based on a moving operation performed by a user, and
   wherein the selection part selects the first parameter which is variable in association with alteration of the location performed by the alteration part.

8. The non-transitory computer-readable medium according to claim 6, wherein the display control part further controls the quantity of objects to be displayed based on a magnitude of the first parameter selected by the selection part on a location corresponding to the location of the first parameter.

9. The non-transitory computer-readable medium according to claim 6, wherein the correlation represents a relation that a magnitude of the first parameter selected by the selection part is proportional to a magnitude of the second parameter extracted by the extraction part.

10. The non-transitory computer-readable medium according to claim 6, wherein the correlation represents a relation that a sum of a magnitude of the first parameter selected by the selection part and a magnitude of the second parameter extracted by the extraction part is constant.

11. An information processing method for use in an information processing apparatus, said method comprising:
    selecting a first parameter from graphic data;
    controlling a quantity of objects to be displayed on a display device;
    extracting a second parameter having a correlation with the first parameter; and
    controlling the quantity of objects based on the correlation,
    the first parameter is a changed length of a first line segment changed by a user and the second parameter is a second line segment which is different from the first line segment and which has the correlation with the first line segment, so that when the user changes a length of the first line segment the display control part automatically controls both (i) a length of the second line segment and (ii) the quantity of objects to be displayed in association with the first line segment and the second line segment, to be changed accordingly.

12. The information processing apparatus according to claim 1, in which the correlation is a sum of the length of the first line segment and the length of the second line segment which is maintained at a constant value.

* * * * *